(12) United States Patent
Huang et al.

(10) Patent No.: US 9,130,466 B2
(45) Date of Patent: Sep. 8, 2015

(54) VOLTAGE CONVERTER CONTROLLER AND VOLTAGE CONVERTER CIRCUIT

(71) Applicant: RICHTEK TECHNOLOGY CORP, Hsinchu County (TW)

(72) Inventors: Chun-Shih Huang, Hsinchu County (TW); Hsin-Hsiung Wang, Hsinchu County (TW)

(73) Assignee: RICHTEK TECHNOLOGY CORP, Hsinchu County (TW)

( * ) Notice: Subject to any disclaimer, the term of this patent is extended or adjusted under 35 U.S.C. 154(b) by 86 days.

(21) Appl. No.: 14/073,511

(22) Filed: Nov. 6, 2013

(65) Prior Publication Data

US 2015/0009721 A1 Jan. 8, 2015

(30) Foreign Application Priority Data

Jul. 3, 2013 (TW) .............................. 102123861 A

(51) Int. Cl.
*H02M 3/335* (2006.01)
(52) U.S. Cl.
CPC ................................. *H02M 3/33507* (2013.01)
(58) Field of Classification Search
USPC ............... 363/18, 21.04, 21.07, 21.08, 21.09, 363/21.1, 21.11, 21.12, 21.15, 21.16, 21.17, 363/21.18, 80, 81, 82, 89, 90; 323/207, 323/222, 271, 282–285
See application file for complete search history.

(56) References Cited

U.S. PATENT DOCUMENTS

| | | | | |
|---|---|---|---|---|
| 8,279,631 B2 * | 10/2012 | Yang | ................................ | 363/20 |
| 2012/0217941 A1 * | 8/2012 | Chen et al. | ..................... | 323/271 |
| 2012/0300508 A1 * | 11/2012 | Fang et al. | .................. | 363/21.17 |

* cited by examiner

*Primary Examiner* — Nguyen Tran
(74) *Attorney, Agent, or Firm* — Chun-Ming Shih

(57) ABSTRACT

A voltage converter controller and a voltage converter circuit, either of which includes a voltage-drop compensating circuit for compensating a voltage drop between an output voltage and a load. The voltage-drop compensating circuit includes a trans-conductance stage and a squarer. The trans-conductance stage outputs a compensating sink current to a voltage dividing terminal of the output voltage and outputs a compensating source current to a reference voltage terminal of an error amplifier. An input terminal of the squarer is coupled to an output terminal of the error amplifier. An output terminal of the squarer is coupled to an input terminal of the trans-conductance stage.

16 Claims, 6 Drawing Sheets

VOLTAGE CONVERTER CONTROLLER AND VOLTAGE CONVERTER CIRCUIT

CROSS-REFERENCES TO RELATED APPLICATIONS

This non-provisional application claims priority under 35 U.S.C. §119(a) on Patent Application No. 102123861 filed in Taiwan, R.O.C. on 3 Jul. 2013, the entire contents of which are hereby incorporated by reference.

BACKGROUND

1. Technical Field

The present invention relates to a voltage converter controller and a voltage converter circuit and, more particular to a voltage converter controller and a voltage converter circuit with voltage-drop compensation.

2. Description of Related Art

Please refer to U.S. Pat. No. 8,143,845 (hereinafter referred to as patent '845) for the prior arts of the skill. Patent '845 discloses a voltage converter circuit of a topology of flyback switching voltage converter with compensating function on a voltage drop caused by a parasitic resistance of a conducting line in a charging circuit. Thus, when charging a battery as a load of the voltage converter circuit, a charging voltage received by the battery can still be maintained within a range defined by system specification with the varied charging current. The voltage converter circuit of patent '845 takes advantage of the characteristics that an output voltage of an error amplifier thereof is positive-correlated to the charging current. By adjusting the reference voltage according to the output voltage of the error amplifier, correspondingly an output voltage of the voltage converter circuit is changed for partly compensating the voltage drop of the conducting line. Furthermore, the error amplifier disclosed in patent '845 was designed to be with finite voltage gain resulting in a limited loop DC gain, which causes a steady-state error on the output voltage of the voltage converter circuit to further compensate the voltage drop of the conducting line. However, such design will result in poor output resistance performance of the voltage converter circuit. Additionally, the variation of the performance of the compensation will be somewhat larger when observed in mass production case.

FIG. 1 is a circuit block diagram of a voltage converter circuit 100 with voltage-drop compensation of another prior art. The voltage converter circuit 100 is a flyback switching voltage converter which converts an input voltage on the converting input terminal 101 to an output voltage on a converting output terminal 103 through a transformer 102 which includes primary windings 1021 and secondary windings 1022. The converting output terminal 103 provides a load current 111 to a load 120 by electric connection through a conducting line 110. The conducting line 110 can be a charging cable and the load 120 can be a rechargeable battery; that is, in this case the voltage converter controller 110 provides a power and charges the load 120 through the conducting wire 110. However, there is a parasitic resistance on the conducting line 110 which causes a voltage drop when the load current 111 flows through the conducting line 110, resulting in difference between the output voltage on the converting output terminal 103 and the charging voltage on the load 120. Because of hardware limitation in most of charging applications, the terminal where the load 120 receives the charging voltage cannot be taken as a feedback point to perform more accurate regulation on the charging voltage. Instead, the converting output terminal 103 is often taken as the feedback point in most applications, as shown in FIG. 1. Therefore, although the converting output terminal 103 taken as the feedback point can be relatively accurate thereon, the charging voltage received by the load 120 will be largely varying accompanying variations of the load current 111 and the parasitic resistance determined by the length and material choices of the conducting line 110. In worst cases, the charging current may not comply with system specifications such as within plus/minus 5-percent range of the rated voltage value.

However in the related art, it is well known that a voltage on the output terminal of an error amplifier is positive-correlated to the load current in a switching voltage converter of current-mode control. For example, the voltage converter circuit 100, as a switching voltage converter of current-mode control, adopts sensing resistor 104 to sense current on a conducting channel of a power switch 105 and to convert it to a voltage signal being fed-back to a comparator 131 to be compared with an output voltage of an error amplifier 132, resulting in a controlling mechanism for cutting off the channel of the power switch 105. From a first-ordered analysis, it is found that in the voltage converter circuit 100, the output voltage of the error amplifier 132 is proportional to a square root of the load current 111. Hence, by detecting the output voltage of the error amplifier 132 to deduce the load current 111, the voltage on the converting output terminal 103 can be manipulated to maintain the charging voltage received by the load 120 to comply with system specifications.

For example, in the voltage converter circuit 100, a transconductance stage 133 is adopted with an input terminal and an output terminal thereof coupled to the output terminal of the error amplifier 132 and a feedback terminal 106 respectively. A voltage on the feedback terminal 106 is generated by dividing the voltage on the converting output terminal 103 by a voltage divider composed of a first feedback resistor 107 and a second feedback resistor 108. The transconductance stage 133 multiplies a voltage on the input terminal thereof by a transconductance and generates correspondingly a compensating sink current coupling to the feedback terminal 106. Therefore, when the load current 111 is larger, the voltage on the output terminal of the error amplifier 132 is correspondingly higher and the transconductance stage 133 generates a larger compensating sink current to the feedback terminal 106 resulting in a higher steady-state voltage on the converting output terminal 103 to compensate for the larger voltage drop on the conducting line 110 and maintain the voltage received by the load 120 within the specified range. On the contrary, when the load current 111 is smaller, the voltage on the output terminal of the error amplifier 132 is correspondingly lower and the transconductance stage 133 generates a smaller compensating sink current to the feedback terminal 106, resulting in a lower steady-state voltage on the converting output terminal 103 to compensate for the smaller voltage drop on the conducting line 110 and still maintain the voltage received by the load 120 within the specified range.

According to first-ordered analysis, it is established that when the transconductance $G_{m1}$ of the transconductance stage 133 follows equation (1), the optimized voltage-drop compensating effect on the converting output terminal 103 can be derived to maintain the variation, due to varying load current, of the voltage received by the load 120 in a smallest range:

$$G_{m1} = \sqrt{\frac{L_P \cdot I_o}{2V_O \cdot T_S}} \cdot \frac{V_{ref} \cdot R_{cab}}{V_O \cdot R_S} \cdot \left(\frac{1}{R_a} + \frac{1}{R_b}\right), \quad (1)$$

where Lp is an effective inductance of the primary windings 1021, Io is the load current 111, Vref is a reference voltage 134, which determines the steady-state voltage of the feedback terminal 106, Rcab is an effective resistance of the conducting line 110, Vo is the output voltage when the load current 111 is zero, Ts is a modulating period of the pulse-width modulation performed in the voltage converter circuit 100, Rs is a resistance of the sensing resistor 104, Ra is a resistance of the first feedback resistor 107, and Rb is a resistance of the second feedback resistor 108.

From equation (1) it can be observed that the optimized value of $G_{m1}$ is correlated to the load current 111. Thus, if a constant transconductance irrelevant to the load current 111 is designed for the transconductance stage 133, the conditions of over-compensating and/or under-compensating will happen under different load current 111 and result in a degraded effect on the voltage-drop compensation. Even the voltage received by the load 120 still cannot meet system specification by the compensation in this way.

SUMMARY

In view of above-mentioned problems, the present invention provides a voltage converter controller and a voltage converter circuit with better voltage-drop compensation.

In the first embodiment, a voltage converter controller is disclosed. The voltage converter controller is adapted to a voltage converter circuit which operates a power switch of the voltage converter circuit to convert an input voltage on a converting input terminal to an output voltage on a converting output terminal through a transformer. The converting output terminal provides a load current to a load by electric connection through a conducting line. The transformer including primary windings and secondary windings connected to the converting input terminal and the converting output terminal respectively. When a channel of the power switch is conducted, the primary windings are coupled to a ground terminal through the channel of the power switch. The voltage converter controller includes a pulse-width-modulation clock, a comparator, an error amplifier, and a voltage-drop compensating circuit.

The pulse-width-modulation clock has a modulating period and controls the conduction of the channel of the power switch. The comparator includes a first comparing input terminal, a second comparing input terminal and an output terminal where the output terminal of the comparator outputs a control signal corresponding to a comparing result of the comparator, the control signal controls a cut-off of the channel of the power switch, the first comparing input terminal receives a signal representative of a current quantity of the channel of the power switch, and the second comparing input terminal receives an error signal. The error amplifier includes a reference input terminal, a feedback input terminal and an error output terminal where the error output terminal outputs the error signal, the reference input terminal receives a reference voltage, and the feedback input terminal couples to the converting output terminal. The voltage-drop compensating circuit includes a transconductance stage and a squarer where the transconductance stage outputs a compensating sink current to the feedback input terminal or outputs a compensating source current to the reference input terminal, an input terminal of the squarer is coupled to the error output terminal, and an output terminal of the squarer is coupled to an input terminal of the transconductance stage.

In the second embodiment, a voltage converter circuit, of which the topology is the same as that of the voltage converter circuit described in the first embodiment, is disclosed.

The present invention is advantageous because a transconductance stage with constant transconductance can still be adopted to derive better voltage-drop compensation effect compared to the prior arts in the disclosed voltage converter controller and voltage converter circuit.

These and other objectives of the present invention will no doubt become obvious to those of ordinary skill in the art after reading the following detailed description of the preferred embodiments that is illustrated in the various figures and drawings.

DETAILED DESCRIPTION OF THE EMBODIMENTS

Figure 2:
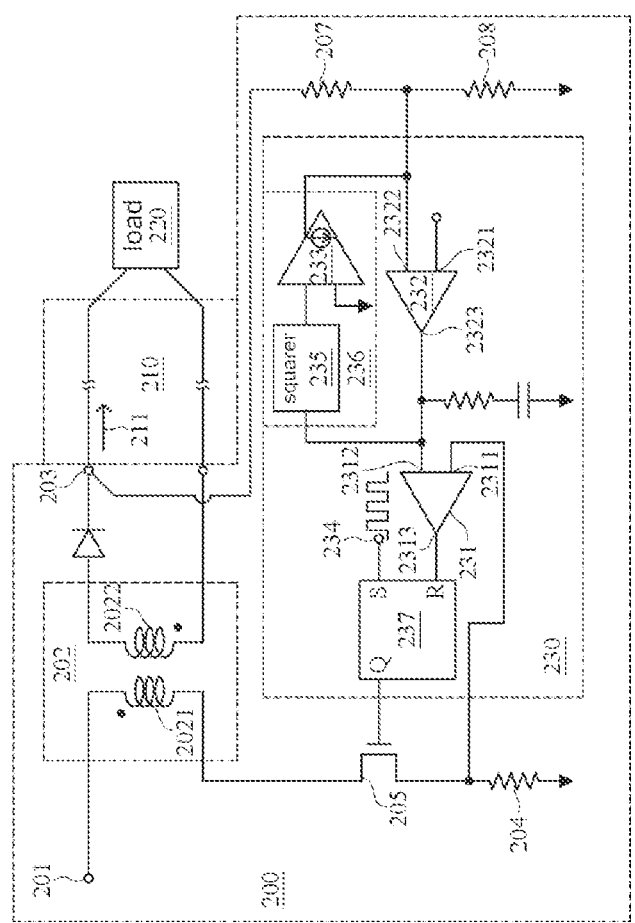
FIG. 2 is a circuit block diagram of the first embodiment of a voltage converter circuit with voltage-drop compensation of the present invention.

FIG. 2 is a circuit block diagram of the first embodiment of a voltage converter circuit of the present invention, that is, a voltage converter circuit 200 with voltage-drop compensation. The voltage converter circuit 200 operates a power switch 205 thereof to convert an input voltage on a converting input terminal 201 to an output voltage on a converting output terminal 203 through a transformer 202. The converting output terminal 203 provides a load current 211 to a load 220 by electric connection through a conducting line 210. The transformer 202 includes primary windings 2021 and secondary windings 2022 connected to the converting input terminal 201 and the converting output terminal 203 respectively. When a channel of the power switch 205 is conducted, the primary windings 2021 are coupled to a ground terminal through the channel of the power switch 205. The voltage converter circuit 200 further includes a voltage converter controller 230 having a pulse-width-modulation clock 234, a comparator 231, an error amplifier 232, and a voltage-drop compensating circuit 236.

The pulse-width-modulation clock 234 has a modulating period and controls the conduction of the channel of the power switch 205. The comparator 231 includes a first comparing input terminal 2311, a second comparing input terminal 2312, and an output terminal 2313. The output terminal 2313 of the comparator 231 outputs a control signal corresponding to a comparing result of the comparator 231. The control signal controls a cut-off of the channel of the power switch 205. The first comparing input terminal 2311 receives a signal representative of a current quantity of the channel of the power switch 205. The second comparing input terminal 2312 receives an error signal. The error amplifier 232 includes a reference input terminal 2321, a feedback input terminal 2322, and an error output terminal 2323. The error output terminal 2323 outputs the error signal. The reference input terminal 2321 receives a reference voltage. The feedback input terminal 2322 couples to the converting output terminal 203.

The voltage-drop compensating circuit 236 includes a transconductance stage 233, and a squarer 235. The transconductance stage 233 outputs a compensating sink current to the feedback input terminal 2322 or outputs a compensating source current to the reference input terminal 2321. An input terminal of the squarer 235 is coupled to the error output terminal 2323, and an output terminal of the squarer 235 is coupled to an input terminal of the transconductance stage 233.

In more detail, when the voltage converter circuit 200 operates under a steady state, the channel of the power switch 205 is set to be conducted at the start of every modulating cycle by a set-reset latch 237 (SR latch) triggered by a positive edge or negative edge of the pulse-width-modulation clock 234. Meanwhile the primary windings 2021 are coupled to the ground terminal through the channel of the power switch 205, and thus a current on the primary windings 2021, which is also the current on the channel of the power switch 205, is linearly increased. In the voltage converter circuit 200, a sensing resistor 204 is adopted to sense current on a conducting channel of a power switch 205, convert it to a voltage signal, and feedback the voltage signal to the comparator 231 by coupling to the first comparing input terminal 2311. The second comparing input terminal 2312 is coupled to the error output terminal 2323 to receive the error signal. When the current on the conducting channel of the power switch 205 increases and finally the voltage on the first comparing input terminal 2311 is larger than that on the second comparing input terminal 2312, the output of the comparator 231 toggles and the latch 237 is reset resulting in a cut-off of the channel of the power switch 205 until the latch 237 is set in the next time the positive edge or negative edge of the pulse-width-modulation clock 234 happens.

From the description of the preceding paragraph, an equation (2) can be derived as follows:

$$V_{com} = I_{peak} \cdot R_S \quad (2),$$

where Vcom is the error voltage on the error output terminal 2323, Ipeak is a peak value of the current on the conducting channel of the power switch 205, and Rs is a resistance of the sensing resistor 204.

According to the law of conservation of energy and assume that energy loss caused by non-idealities of components can be neglected, it can be demonstrated that in every modulating cycle, the energy added to the primary windings 2021 when the channel of the power switch 205 conducted will equal to that being transferred to the converting output terminal 203 when the channel of the power switch is cut-off. Thus equation (3) can be derived as follows:

$$\frac{1}{2} L_P \cdot I_{peak}^2 \cdot \frac{1}{T_S} = V_O \cdot I_O, \quad (3)$$

where Lp is an effective inductance of the primary windings 2021, Ts is the modulating period, Vo is the output voltage on the converting output terminal 203 when the load current 211 is zero, and Io is the load current 211.

Deriving a representative of Ipeak from equation (3) and adopting it in the equation (2), a representative of the error voltage, that is Vcom, of the error output terminal 2323 can be described in the equation (4) shown below:

$$V_{COM} = \sqrt{\frac{2 \cdot V_O \cdot I_O \cdot T_S}{L_P}} \cdot R_S. \quad (4)$$

Figure 1:
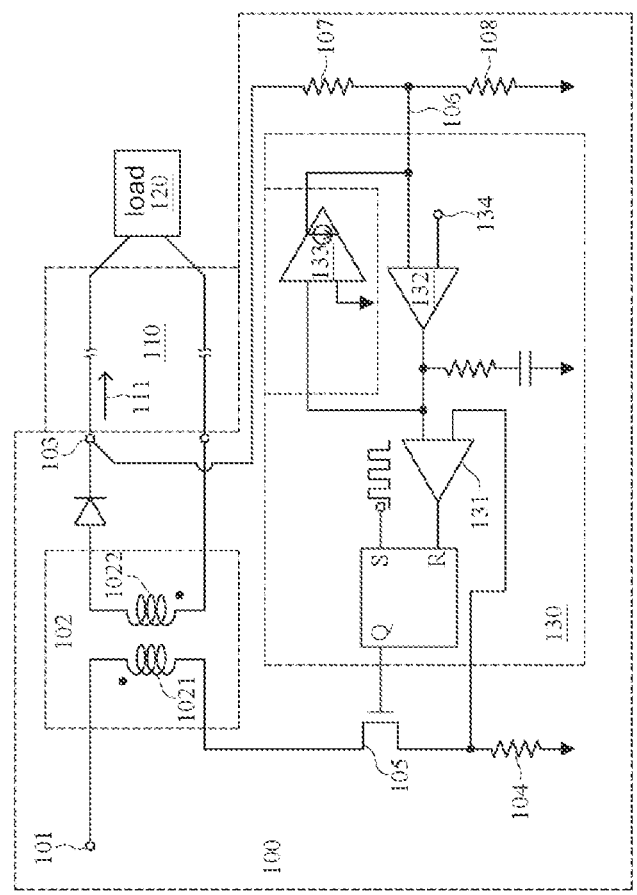
FIG. 1 is a circuit block diagram of a voltage converter circuit with voltage-drop compensation of prior art.

That is, the voltage on the error output terminal 2323 of the error amplifier 232 is proportional to a square root of the load current 211. By equation (4) and considering a voltage drop on the conducting line 210 is linearly increased with the load current 211, equation (1) can be concluded and accordingly the voltage drop compensation can be designed. However as is seen in the prior art such as FIG. 1 disclosed, the shortcoming of over-compensating and/or under-compensating exists in this way.

As shown in FIG. 2, the voltage-drop compensating circuit 236 outputs a compensating sink current to the feedback input terminal 2322 to compensate a voltage drop caused by the conducting line 210. The voltage converter circuit 200 includes a first feedback resistor 207 and a second feedback resistor 208, where the first feedback resistor is coupled between the converting output terminal 203 and the feedback input terminal 2322, and the second feedback resistor 208 is coupled between the feedback input terminal 2322 and the ground terminal. That is, the voltage on the converting output terminal 203 is divided by the first feedback resistor 207 and the second feedback resistor 208, and the divided voltage is then fed back to the feedback input terminal 2322.

More specifically, the voltage-drop compensating circuit 236 includes squarer 235 where a voltage on an output terminal thereof is the square of that on an input terminal thereof. That is, the error voltage Vcom on the error output terminal 2323 is squared and passed into the transconductance stage 233 to generate a sink current coupling to the feedback input terminal 2322. The squarer 235 and the transconductance stage 233 can be realized by any related prior art that is adapted in the embodiment. Moreover, it can be proven that by adopting the squarer 235 preceding the transconductance stage 233, the transconductance can be a constant irrelevant to the load current 211 and the optimal compensation effect shown in equation (1) can still be reached. A representative of the optimal transconductance $G_{m2}$ for the transconductance stage 233 is shown as equation (5) as follows:

$$G_{m2} = \frac{L_P \cdot V_{ref} \cdot R_{cab}}{2 V_O^2 \cdot T_S \cdot R_S} \cdot \left( \frac{1}{R_a} + \frac{1}{R_b} \right), \quad (5)$$

where Ra is a resistance of the first feedback resistor 207, and Rb is a resistance of the second feedback resistor 208.

By observing equation (5), it is evident that the parameters in the representative of $G_{m2}$ can be kept constant when the voltage converter circuit 200 is under operation, so is $G_{m2}$ itself, and the voltage drop compensation effect for the conducting line 210 is optimized. From a product point of view, even if there is inevitable variation on Rcab because of different material of the conducting line 210 adopted in different system applications or product lots, a system designer can still obtain the optimal voltage drop compensation effect for the same hardware circuit by changing design values of Ra and Rb to manipulate $G_{m2}$. Needless to say, in view of the possible differences on other parameters such as Lp or Vo in different applications or product lots, the same manipulation on $G_{m2}$ can also be performed to reach the optimal compensation effect.

It is noted that although the sensing resistor 204 is adopted to detect the current on the conducting channel of the power switch 205, it is possible that in other embodiments, the sensing resistor 204 is not adopted and instead the power switch 205 is connected directly between the primary windings 2021 and the ground terminal. In this way the voltage across the channel of the power switch 205 can be directly fed back to the first comparing input terminal 2311 of the comparator 231. Thus, the equation (5) can be modified to equation (6) as shown below to be adopted in this case:

$$G_{m2} = \frac{L_P \cdot V_{ref} \cdot R_{cab}}{2 V o^2 \cdot T_S \cdot V_C / I_C} \cdot \left( \frac{1}{R_a} + \frac{1}{R_b} \right), \quad (6)$$

where Vc and Ic are a voltage on the first comparing input terminal 2311 and a current on the channel of the power switch 205 when the channel of the power switch 205 is conducted.

Furthermore, the voltage converter controller 230 can be an integrated circuit realized by a semiconductor process, which can save hardware costs and shrink the physical size. The voltage converter controller 230 realized as an integrated circuit is well known in this art and is prevailing in the design of the applications of voltage converter circuit.

Figure 3:
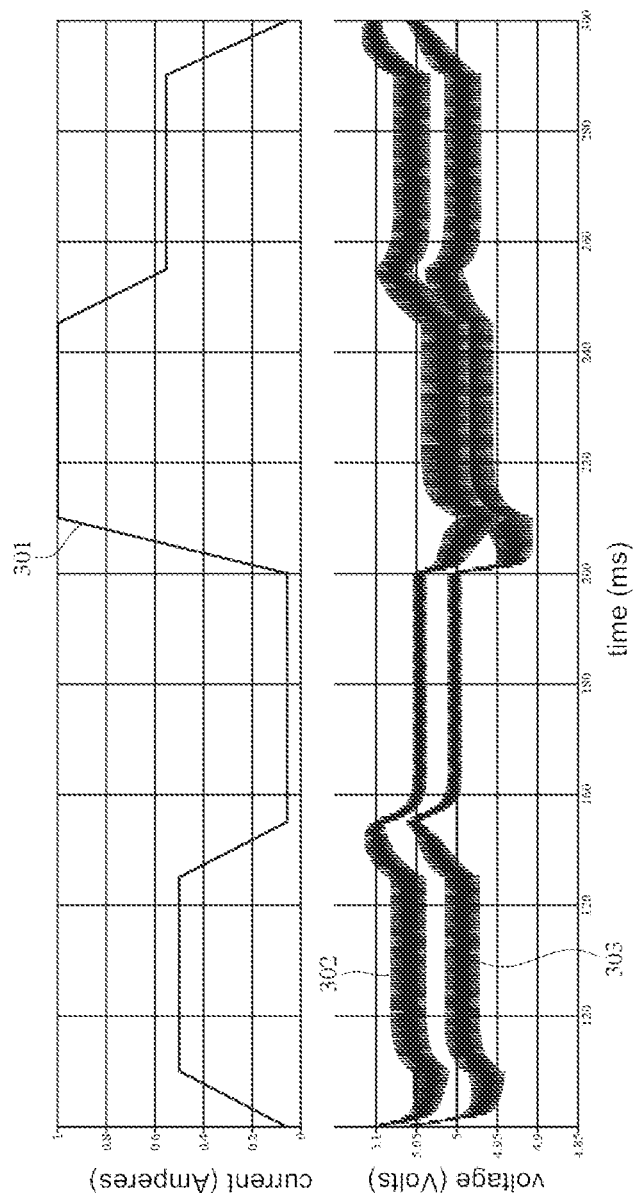
FIG. 3 is a waveform diagram of a voltage converter circuit according to the first embodiment of the present invention.

FIG. 3 is a waveform diagram of a voltage converter circuit according to the voltage converter circuit 200 of the present invention. Waveform 301 is a waveform of the load current 211. Waveform 302 is a waveform of the voltage received by the load 120 in the voltage converter circuit 100 disclosed as an embodiment of the prior art in FIG. 1. Waveform 303 is a waveform of the voltage received by the load 220 in the voltage converter circuit 200 disclosed as an embodiment in FIG. 2. In FIG. 3, the steady-state rated voltage received by a load is 5 volts. The voltage ripple in waveform 301 and 302 is normal and is the characteristics of a switching voltage converter circuit. Besides, waveform 302 corresponds to the voltage converter circuit 100 where the transconductance stage 133 has a constant transconductance resulting in conditions of over-compensating and/or under-compensating.

Referring to FIG. 3, when the load current 211 toggles between heavy-load and light-load as is shown in waveform 301, the steady-state voltage received by the load 120 in the voltage converter circuit 100 presents a larger variation range as is shown in waveform 302. On the other hand, the steady-state voltage received by the load 220 in the voltage converter circuit 200 is stable as is shown in waveform 302. For example, in the vicinity of time instant of 180 milliseconds (ms), the load current 211 is light, and waveform 302 presents a higher steady-state voltage than waveform 303, which is quite close to the rated voltage of 5 volts. Furthermore, in the vicinity of 230 ms the load current 211 is heavy, and the steady-state voltage presented by the waveform 303 is still closer to 5 volts than the waveform 302.

Figure 4:
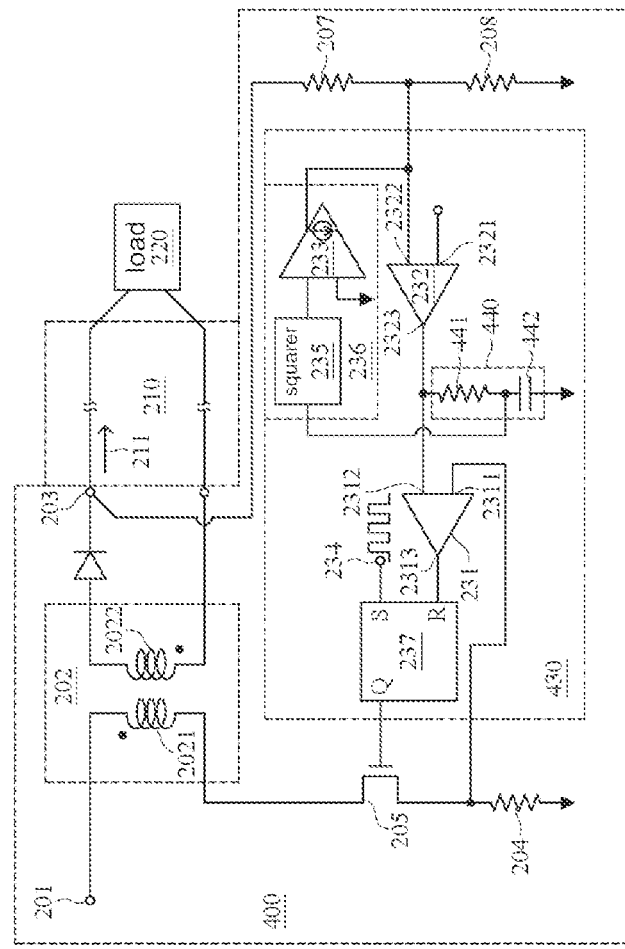
FIG. 4 is a circuit block diagram of the second embodiment of a voltage converter circuit with voltage-drop compensation of the present invention.

FIG. 4 is a circuit block diagram of the second embodiment of a voltage converter circuit of the present invention, that is, a voltage converter circuit 400 with voltage-drop compensation. The voltage converter circuit 400 includes a part of the components of the voltage converter circuit 200 shown in FIG. 2 and further includes a voltage converter controller 430 and a loop compensating circuit 440. It can be referred to if any corresponding part in the voltage converter circuit 200 for the description on the functions and the characteristics of each part of voltage converter circuit 400. The loop compensating circuit 440 is coupled to the error output terminal 2323 and is composed of a serial connection of a compensating resistor 441 and a compensating capacitor 442. The difference between the voltage converter circuit 400 and the voltage converter circuit 200 is that in the voltage converter circuit 400, the input terminal of the squarer 235 is connected to a connection point of the compensating resistor 441 and the compensating capacitor 442. On the other hand in the voltage converter circuit 200, the input terminal of the squarer 235 is connected to the error output terminal 2323. Utilizing connection topology of the loop compensating circuit 440 and the squarer 235, the phase margin of the loop of the voltage converter circuit 400 can be better than that of voltage converter circuit 200. That is, voltage converter circuit 400 has better characteristics on transient response, and some shortcomings such as overshoot, undershoot and/or ripple can be alleviated to avoid violating system specifications.

Figure 5:
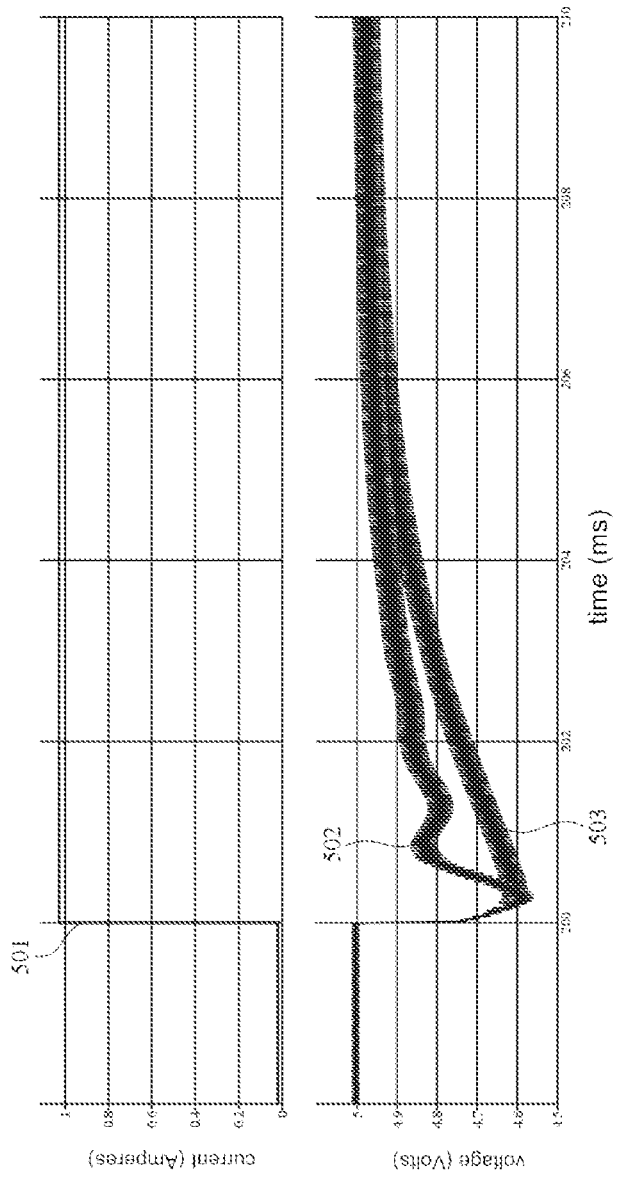
FIG. 5 is a waveform diagram of a step response of a voltage converter circuit according to the present invention.

FIG. 5 is a waveform diagram of a step response of a voltage converter circuit according to the present invention. Waveform 501 is a waveform of a step wave of the load current. Waveform 502 is a waveform of a step response of the output voltage of the voltage converter circuit 200. Waveform 503 is a waveform of a step response of the output voltage of the voltage converter circuit 400. As shown in FIG. 5, in the vicinity of time instant of 200 ms, the load current changes from light-load to heavy-load in a very short time, meanwhile the voltage converter circuit 200 and 400 respond the step change of load current, and are prone to recover to the steady-state rated voltage, such as 5 volts in FIG. 5. By observing waveforms 502 and 503, it can be found that at the start of the step instant, the voltage droop in both waveforms are quite consistent. However in the course of recovery, waveform 502 has larger ringing and waveform 503 recovers to the rated voltage in a smooth way because of better phase margin of the loop thereof. The ringing presented in waveform 502 is not welcomed in a system design since the ringing amplitude can be even worse due to parameter variations of devices caused by temperature and/or aging, and further system specifications can possibly be violated.

Figure 6:
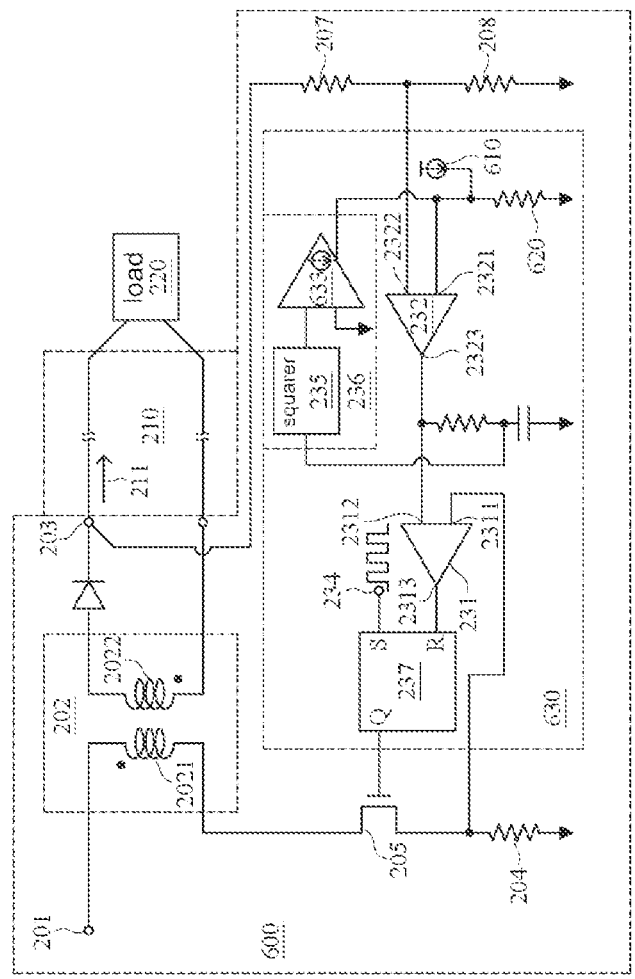
FIG. 6 is a circuit block diagram of the third embodiment of a voltage converter circuit with voltage-drop compensation of the present invention.

FIG. 6 is a circuit block diagram of the third embodiment of a voltage converter circuit of the present invention, that is, a voltage converter circuit 600 with voltage-drop compensation. The voltage converter circuit 600 includes a part of the components of the voltage converter circuit 200 shown in FIG. 2 and further includes a voltage converter controller 630, a transconductance stage 633, a reference current 610 and a reference resistor 620. It can be referred to if any corresponding part in the voltage converter circuit 200 for the description on the functions and the characteristics of each part of voltage converter circuit 600. Further, the transconductance stage 633 outputs a compensating source current to the reference input terminal 2321, and the reference current 610 and the reference resistor 620 are coupled to the reference input terminal 2321 to generate the reference voltage described in the previous embodiments.

More specifically, the transconductance stage 633 outputs a compensating source current flowing through the reference resistor 620 to modulate the reference voltage on the reference input terminal 2321. For example, when the load current 211 is increased, the transconductance 633 correspondingly outputs a larger compensating source current to increase the voltage on the reference input terminal 2321. Thus, the output voltage also becomes larger to compensate a larger voltage drop on the conducting line 210 caused by the larger load current 211. Finally, a voltage received by the load 220 can still be maintained within the range complying with system specifications. It is noted that the realization of the transconductance 633, the design values of the reference current 610, and the reference resistor 620 can be easily evaluated by people skilled in the art after understanding the descriptions of the above embodiments of the voltage converter circuit of the present invention.

The aforementioned descriptions represent merely the preferred embodiment of this invention, without any intention to limit the scope of this invention thereto. Various equivalent changes, alterations, or modifications based on the claims of this invention are all consequently viewed as being embraced by the scope of this invention.

What is claimed is:

1. A voltage converter controller, adapted to a voltage converter circuit which operates a power switch of the voltage converter circuit to convert an input voltage on a converting input terminal to an output voltage on a converting output terminal through a transformer, the converting output terminal providing a load current to a load by electric connection through a conducting line, the transformer including primary windings and secondary windings connected to the converting input terminal and the converting output terminal respectively, when a channel of the power switch conducted, the primary windings coupled to a ground terminal through the channel of the power switch, the voltage converter controller comprising:
    a pulse-width-modulation clock, having a modulating period and controlling the conduction of the channel of the power switch;
    a comparator, including a first comparing input terminal, a second comparing input terminal, and an output terminal, wherein the output terminal of the comparator outputs a control signal corresponding to a comparing result of the comparator, the control signal controls a cut-off of the channel of the power switch, the first comparing input terminal receives a signal representative of a current quantity of the channel of the power switch, and the second comparing input terminal receives an error signal;
    an error amplifier, including a reference input terminal, a feedback input terminal, and an error output terminal, wherein the error output terminal outputs the error signal, the reference input terminal receives a reference voltage, and the feedback input terminal couples to the converting output terminal; and
    a voltage-drop compensating circuit, including a transconductance stage and a squarer, wherein the transconductance stage outputs a compensating sink current to the feedback input terminal or outputs a compensating source current to the reference input terminal, an input terminal of the squarer is coupled to the error output terminal, and an output terminal of the squarer is coupled to an input terminal of the transconductance stage, wherein the squarer is realized by a multiplier, the error signal on the error output terminal is squared and passed into the transconductance stage via the squarer.

2. The voltage converter controller of claim 1, wherein the voltage converter controller is an integrated circuit realized by a semiconductor process.

3. The voltage converter controller of claim 1, further comprising a loop compensating circuit which is coupled to the error output terminal and is composed of a serial connection of a compensating resistor and a compensating capacitor, and the input terminal of the squarer connected to a connection point of the compensating resistor and the compensating capacitor.

4. The voltage converter controller of claim 3, wherein the voltage converter controller is an integrated circuit realized by a semiconductor process.

5. The voltage converter controller of claim 1, wherein the transconductance stage outputs a compensating sink current to the feedback input terminal, and the voltage converter circuit includes a first feedback resistor and a second feedback resistor, wherein the first feedback resistor is coupled between the converting output terminal and the feedback input terminal, the second feedback resistor is coupled between the feedback input terminal and the ground terminal, and the transconductance stage has a constant transconductance.

6. The voltage converter controller of claim 5, wherein the voltage converter controller is an integrated circuit realized by a semiconductor process.

7. The voltage converter controller of claim 5, wherein design values of a resistance Ra of the first feedback resistor and a resistance Rb of the second feedback resistor can be described in the following equation:

$$G_m = \frac{L_P \cdot V_{ref} \cdot R_{cab}}{2V_o^2 \cdot T_S \cdot V_C / I_C} \cdot \left(\frac{1}{R_a} + \frac{1}{R_b}\right),$$

wherein Gm is the constant transconductance, Lp is an effective inductance of the primary windings, Vref is the reference voltage, Rcab is an effective resistance of the conducting line, Vo is the output voltage when the load current is zero, Ts is the modulating period and Vc and Ic are a voltage on the first comparing input terminal and a current on the channel of the power switch when the channel of the power switch is conducted.

8. The voltage converter controller of claim 7, wherein the voltage converter controller is an integrated circuit realized by a semiconductor process.

9. A voltage converter circuit, comprising:
    a converting input terminal, having an input voltage;
    a converting output terminal, having an output voltage and providing a load current to a load by electric connection through a conducting line;
    a transformer, including primary windings and secondary windings connected to the converting input terminal and the converting output terminal respectively;
    a power switch, wherein when a channel of the power switch is conducted, the primary windings is coupled to a ground terminal through the channel of the power switch;
    a pulse-width-modulation clock, having a modulating period and controlling the conduction of the channel of the power switch;
    a comparator, including a first comparing input terminal, a second comparing input terminal, and an output terminal, wherein the output terminal of the comparator outputs a control signal corresponding to a comparing result of the comparator, the control signal controls a cut-off of the channel of the power switch, the first comparing input terminal receives a signal representative of a current quantity of the channel of the power switch, and the second comparing input terminal receives an error signal;
    an error amplifier, including a reference input terminal, a feedback input terminal, and an error output terminal, wherein the error output terminal outputs the error signal, the reference input terminal receives a reference voltage, and the feedback input terminal couples to the converting output terminal; and a voltage-drop compensating circuit, including a transconductance stage and a squarer, wherein the transconductance stage outputs a compensating sink current to the feedback input terminal or outputs a compensating source current to the reference input terminal, an input terminal of the squarer is coupled to the error output terminal, and an output terminal of the squarer is coupled to an input terminal of the transconductance stage, wherein the squarer is realized by a multiplier, the error signal on the error output terminal is squared and passed into the transconductance stage via the squarer.

10. The voltage converter circuit of claim 9, wherein the comparator, the error amplifier, and the voltage-drop compensating circuit are integrated in an integrated circuit realized by a semiconductor process.

11. The voltage converter circuit of claim 9, further comprising a loop compensating circuit which is coupled to the error output terminal and is composed of a serial connection of a compensating resistor and a compensating capacitor, and the input terminal of the squarer connected to a connection point of the compensating resistor and the compensating capacitor.

12. The voltage converter circuit of claim 11, wherein the comparator, the error amplifier and the voltage-drop compensating circuit are integrated in an integrated circuit realized by a semiconductor process.

13. The voltage converter circuit of claim 9, wherein the transconductance stage outputs a compensating sink current to the feedback input terminal, and the voltage converter circuit includes a first feedback resistor and a second feedback resistor, wherein the first feedback resistor is coupled between the converting output terminal and the feedback input terminal, the second feedback resistor is coupled between the feedback input terminal and the ground terminal, and the transconductance stage has a constant transconductance.

14. The voltage converter circuit of claim 13, wherein the comparator, the error amplifier and the voltage-drop compensating circuit are integrated in an integrated circuit realized by a semiconductor process.

15. The voltage converter circuit of claim 13, wherein design values of a resistance Ra of the first feedback resistor and a resistance Rb of the second feedback resistor can be referred to the following equation:

$$G_m = \frac{L_P \cdot V_{ref} \cdot R_{cab}}{2 V o^2 \cdot T_S \cdot V_C / I_C} \cdot \left( \frac{1}{R_a} + \frac{1}{R_b} \right),$$

wherein Gm is the constant transconductance, Lp is an effective inductance of the primary windings, Vref is the reference voltage, Rcab is an effective resistance of the conducting line, Vo is the output voltage when the load current is zero, Ts is the modulating period, and Vc and Ic are a voltage on the first comparing input terminal and a current on the channel of the power switch when the channel of the power switch is conducted.

16. The voltage converter circuit of claim 15, wherein the comparator, the error amplifier and the voltage-drop compensating circuit are integrated in an integrated circuit realized by a semiconductor process.

* * * * *